United States Patent
Price et al.

(10) Patent No.: US 9,235,225 B2
(45) Date of Patent: Jan. 12, 2016

(54) METHOD AND APPARATUS REDUCED SWITCH-ON RATE LOW DROPOUT REGULATOR (LDO) BIAS AND COMPENSATION

(71) Applicant: QUALCOMM Incorporated, San Diego, CA (US)

(72) Inventors: Burt L. Price, Raleigh, NC (US); Yeshwant Nagaraj Kolla, Wake Forest, NC (US); Dhaval R. Shah, Raleigh, NC (US)

(73) Assignee: QUALCOMM Incorporated, San Diego, CA (US)

(*) Notice: Subject to any disclaimer, the term of this patent is extended or adjusted under 35 U.S.C. 154(b) by 73 days.

(21) Appl. No.: 13/788,115

(22) Filed: Mar. 7, 2013

(65) Prior Publication Data

US 2014/0125300 A1    May 8, 2014

Related U.S. Application Data (60) Provisional application No. 61/722,876, filed on Nov. 6, 2012.

(51) Int. Cl.
     *G05F 1/00*     (2006.01)
     *G05F 1/46*     (2006.01)
     *G05F 1/575*     (2006.01)

(52) U.S. Cl.
     CPC ............... *G05F 1/468* (2013.01); *G05F 1/575* (2013.01)

(58) Field of Classification Search
     USPC ............... 323/274, 280, 284, 289, 315, 316; 327/50–52, 54, 56, 77, 80, 89; 361/13, 361/18
     See application file for complete search history.

(56) References Cited

U.S. PATENT DOCUMENTS

| | | | |
|---|---|---|---|
| 4,656,647 | A | 4/1987 | Hotine |
| 5,696,465 | A | 12/1997 | Ishizuka |

(Continued)

FOREIGN PATENT DOCUMENTS

| | | |
|---|---|---|
| CN | 102117089 A | 7/2011 |
| EP | 1635239 A1 | 3/2006 |

(Continued)

OTHER PUBLICATIONS

Cristea I., et al., "Supply Concept in Input Powered Two Channel Switch", Semiconductor Conference (CAS), 2010 International, IEEE, Piscataway, NJ, USA, Oct. 11, 2010, pp. 469-472, XP031812172, ISBN: 978-1-4244-5783-0.

(Continued)

*Primary Examiner* — Adolf Berhane
*Assistant Examiner* — Gary Nash
(74) *Attorney, Agent, or Firm* — Xiaotun Qiu (57) ABSTRACT

A switchable bias current biases, in an operational state, a differential amplifier with a full-slew bias current. A system on/off signal transitions from an operational state to a power-down state. The transition disables the differential amplifier and switches the switchable bias current to a reduced slew bias current. The system on/off signal transitions from the power-down state to the operational state, the differential amplifier is enabled, and the switchable bias current is delayed, by a reduced slew duration, from switching to the full-slew bias current. The enabled differential amplifier slews toward a reference voltage at a reduced slew rate caused by the reduced slew bias current. The switchable bias current, after the reduced slew duration, switches to the full-slew bias current. Optionally, a regulated pass gate is disabled in response to the system on/off signal transitioning from the operational state to the power-down state.

18 Claims, 4 Drawing Sheets

(56) References Cited

U.S. PATENT DOCUMENTS

| | | | |
|---|---|---|---|
| 5,982,226 A | 11/1999 | Rincon-Mora | |
| 6,031,417 A | 2/2000 | Bechman | |
| 6,046,577 A | 4/2000 | Rincon-Mora et al. | |
| 6,184,744 B1 * | 2/2001 | Morishita | 327/541 |
| 6,188,211 B1 | 2/2001 | Rincon-Mora et al. | |
| 6,188,212 B1 | 2/2001 | Larson et al. | |
| 6,246,221 B1 | 6/2001 | Xi | |
| 6,333,623 B1 | 12/2001 | Heisley et al. | |
| 6,373,233 B2 * | 4/2002 | Bakker et al. | 323/282 |
| 6,518,737 B1 | 2/2003 | Stanescu et al. | |
| 6,522,111 B2 | 2/2003 | Zadeh et al. | |
| 6,617,833 B1 * | 9/2003 | Xi | 323/282 |
| 6,703,815 B2 | 3/2004 | Biagi | |
| 7,091,710 B2 | 8/2006 | Yang et al. | |
| 7,142,022 B2 * | 11/2006 | Kang et al. | 327/53 |
| 7,215,103 B1 | 5/2007 | Wong et al. | |
| 7,224,156 B1 | 5/2007 | Chen | |
| 7,339,416 B2 | 3/2008 | Rincon-Mora et al. | |
| 7,612,547 B2 | 11/2009 | Renous | |
| 7,728,569 B1 | 6/2010 | Le et al. | |
| 7,768,351 B2 | 8/2010 | Ivanov et al. | |
| 8,044,653 B2 | 10/2011 | Maige et al. | |
| 8,072,196 B1 | 12/2011 | Li | |
| 8,080,983 B2 | 12/2011 | Lourens et al. | |
| 8,169,203 B1 | 5/2012 | Vemula | |
| 8,242,761 B2 | 8/2012 | Napravnik | |
| 2005/0231180 A1 | 10/2005 | Nagata et al. | |
| 2006/0055383 A1 | 3/2006 | Eberlein | |
| 2006/0232327 A1 | 10/2006 | Takagi et al. | |
| 2007/0191683 A1 | 8/2007 | Fujimori | |
| 2008/0061881 A1 | 3/2008 | Takagi | |
| 2008/0081947 A1 | 4/2008 | Irion et al. | |
| 2008/0224680 A1 * | 9/2008 | Suzuki | 323/284 |
| 2009/0066306 A1 | 3/2009 | Noda | |
| 2009/0072984 A1 | 3/2009 | Cheng et al. | |
| 2010/0013449 A1 * | 1/2010 | Miki | 323/282 |
| 2010/0156364 A1 * | 6/2010 | Cho et al. | 323/280 |
| 2011/0241769 A1 | 10/2011 | Jung | |
| 2012/0161734 A1 * | 6/2012 | Wu | 323/282 |
| 2012/0176107 A1 | 7/2012 | Shrivas et al. | |
| 2012/0212199 A1 | 8/2012 | Amer et al. | |
| 2012/0229202 A1 | 9/2012 | Nikolov et al. | |
| 2014/0117956 A1 | 5/2014 | Price et al. | |
| 2014/0117958 A1 | 5/2014 | Price et al. | |
| 2014/0139197 A1 | 5/2014 | Price et al. | |

FOREIGN PATENT DOCUMENTS

| | | |
|---|---|---|
| EP | 2082680 A1 | 7/2009 |
| JP | 2001137182 A | 5/2001 |
| JP | 2005205072 A | 8/2005 |
| JP | 2006230680 A | 9/2006 |
| JP | 2007280025 A | 10/2007 |
| KR | 20090028282 A | 3/2009 |
| WO | 2012104673 A1 | 8/2012 |

OTHER PUBLICATIONS

Kim Y.I., et al., "Fast Transient Capacitor-Less LDO Regulator Using Low-Power Output Voltage Detector", Electronics Letters, IEE Stevenage, vol. 48, No. 3, Feb. 2, 2012, pp. 175-177, XP006040603, ISSN: 0013-5194, DOI: 10.1049/EL.2011.

Liu X. et al., "Design of off-chip capacitor-free CMOS low-dropout voltage regulator", Circuits and Systems, 2008. APCCAS 2008. IEEE Asia Pacific Conference on, IEEE, Piscataway, NJ, USA, Nov. 30, 2008, pp. 1316-1319, XP031405243, DOI: 10.1109/APCCAS. 2008.4746270 ISBN: 978-1-4244-2341-5.

Ying O.P., et al., "An Output-Capacities Low-Dropout Regulator with Direct Voltage-Spike Detection", IEEE Journal of Solid-State Circuits, Service Center, Piscataway, NJ, USA, vol. 45, No. 2, Feb. 1, 2010, pp. 458-466, XP011301260, ISSN: 0018-9200, DOI: 10.1109/JSSC.2009.2034805.

EP Search Report dated Jun. 18, 2013.

International Search Report and Written Opinion—PCT/US2013/068522—ISA/EPO—Jun. 30, 2014.

* cited by examiner

METHOD AND APPARATUS REDUCED SWITCH-ON RATE LOW DROPOUT REGULATOR (LDO) BIAS AND COMPENSATION

CLAIM OF PRIORITY UNDER 35 U.S.C. §119

The present Application for patent claims priority to Provisional Application No. 61/722,876 entitled "METHOD AND APPARATUS REDUCED SWITCH-ON RATE LOW DROPOUT REGULATOR (LDO) BIAS AND COMPENSATION" filed Nov. 6, 2012, and assigned to the assignee hereof and hereby expressly incorporated by reference herein.

FIELD OF DISCLOSURE

The technical field of the disclosure relates to voltage regulators am, more particularly, to low dropout (LDO) regulators.

BACKGROUND

An LDO regulator is a direct current (DC) linear voltage regulator that can operate with a very low dropout, where "dropout" (also termed "dropout voltage") means the difference between the input voltage (e.g., received power supply rail voltage) and the regulated out voltage. As known in the conventional LDO regulator arts, a low dropout voltage may provide, for example, higher efficiency and concomitant reduction in heat generation, as well as lower minimum operating voltage.

SUMMARY

The following summary is not an extensive overview of all contemplated aspects. Its sole purpose is to present some concepts of one or more aspects in a simplified form as a prelude to the more detailed description that is presented later.

One example reduced switch-on slew LDO regulator according to one exemplary embodiment can include a pass gate controllably coupling, in response to a pass gate control signal, a voltage rail to a regulator output. In an aspect, the pass gate control signal is generated by a controllable slew differential amplifier, switchable between a slew-limiting state and a full-slew state. Further to the aspect, the controllable slew differential amplifier is configured to receive a feedback from the regulator output, and to generate the pass gate control signal, based on a reference voltage and the feedback, at a full-slew rate in the full-slew state, and at a reduced slew rate in the slew-limiting state.

One example reduced switch-on slew LDO regulator according to one exemplary embodiment may further include a pass gate disabling circuit configured selectively over-ride the pass gate control signal and switch the pass gate OFF.

In an aspect, the controllable slew differential amplifier of one example reduced switch-on slew LDO regulator according to one exemplary embodiment may include a switchable tail current source switchable between a slew-limiting bias current and a full-slew bias current. In a related aspect, the controllable slew differential amplifier may be configured to generate the pass gate control signal at the full-slew rate with the full-slew bias current, and at the reduced slew rate with the slew-limiting bias current. In a further aspect, the switchable tail current source may include an ON-OFF switchable full-slew bias current source configured to source the full-slew bias current when ON, in parallel with a reduced slew bias current source configured to source the reduced slew bias current.

One example reduced switch-on slew LDO regulator according to one exemplary embodiment may further include, in an aspect, a tail current control circuit configured to switch the switchable tail current source to the slew-limiting bias current in response to an ON-to-OFF transition of a system ON-OFF signal (ST_ON/OFF). In a further aspect, the tail current control circuit may be configured to switch the switchable tail current source, at a delay DLY after an OFF-to-ON transition of ST_ON/OFF, from the slew-limiting bias current to the full-slew bias current.

In a related aspect, the controllable slew differential amplifier may be configured to slew, in response to the OFF-to-ON transition of ST_ON/OFF, from an initial zero voltage to approximately Vref, at a reduced slew rate, in a time duration approximately equal to DLY.

In another aspect, in one example reduced switch-on slew LDO regulator according to one exemplary embodiment, the tail current control circuit may include a delay capacitor, and a charging circuit configured to charge the delay capacitor, in response to the OFF-to-ON transition of ST_ON/OFF, from a zero voltage to a tail current source switching threshold voltage, in a charging time having a duration approximately equal to DLY.

In an aspect, one example reduced switch-on slew LDO regulator according to one exemplary embodiment may further include a pass gate control line carrying the pass gate control signal to a control gate of the pass gate. In related aspect, the pass gate disabling circuit may comprise a two-position switch, the two-position switch having a disabling position and an operational position, configured such that the disabling position provides a short of the control gate to a voltage disabling the pass gate, and the operational position does not provide the short of the control gate. In another related aspect, the two-position switch may be configured to be movable, or to move, between the disabling position and the operational position based on an ON-OFF state of ST_OFF/ON.

One example reduced switch-on slew LDO regulator according to one exemplary embodiment may further include a feedback element that may be coupled to the regulator output and to an input of the differential amplifier to provide the feedback, and a compensation network coupling the pass gate control line to the feedback element. In a further aspect, the compensation network may have a compensation capacitor and a compensation resistor, and the pass gate disabling circuit may be further configured to charge the compensation capacitor when the two-position switch is in the disabling position.

In another aspect, in one example reduced switch-on slew LDO regulator according to one exemplary embodiment, the pass gate disabling circuit may be further configured to allow the compensation capacitor to discharge the pass gate control line, to a voltage at which the pass gate is operational, in response to switching the two-position switch from the disabling position to the operational position. In a related aspect, a rate of the reduced slew rate may be based, at least in part, on at least one of a capacitance of the compensation capacitor or a resistance of the compensation resistor, or both.

One example method according to one or more exemplary embodiments may provide reduced switch-on slew low dropout (LDO) regulating with a pass gate controlled by a differential amplifier having differential inputs, and a transistor controlled by one of the differential inputs. Example methods according to various exemplary embodiments may include biasing the transistor with a bias current, the biasing current being a full-slew bias current, and providing to the differential inputs a reference voltage and a feedback of an output of the pass gate. In an aspect, example methods may further provide, in response to an ON-to-OFF transition of a system on/off signal (ST_ON/OFF), disabling the feedback and switching the bias current to a slew-limiting bias current, lower than the full-slew bias current. In a related aspect, example methods may further include, in response to an OFF-to-ON transition of ST_ON/OFF, enabling the feedback to the differential amplifier and, at a time delayed from the OFF-to-ON transition by a reduced slew duration, switching the bias current to the full-slew bias current.

In one example method according to one exemplary embodiment, the switching the biasing to bias the transistor with the full-slew bias current may include commencing, in response to the OFF-to-ON transition of ST_ON/OFF, a charging of a delay capacitor and, in response to the delay capacitor reaching a given threshold voltage level, performing the switching the biasing to bias the transistor with the full-slew bias current.

One example reduced switch-on slew LDO regulator according to various exemplary embodiments can include a differential amplifier having difference inputs, an output, and a transistor having a gate coupled to one of the difference inputs, in combination with a pass gate controlled by the output of the differential amplifier. The pass gate may include a pass gate input for coupling to a power rail, and a pass gate output, in further combination with means for receiving a system ON/OFF signal (ST_ON/OFF) and in response to an OFF-to-ON transition of ST_ON/OFF, establishing a feedback from the pass gate output to one of the difference inputs and biasing the transistor with a full-slew bias current, and in response to an ON-to-OFF transition of ST_ON/OFF, disabling the feedback and switching the biasing of the transistor to a slew-limiting bias current.

BRIEF DESCRIPTION OF THE DRAWINGS

The accompanying drawings found in the attachments are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is only for the purpose of describing particular examples according to embodiments, and is not intended to be limiting of embodiments of the invention. As used herein, the singular forms "a", "an" and "the" are intended to include the plural forms as well, unless the context clearly indicates otherwise. As used herein the terms "comprises", "comprising,", "includes" and/or "including" specify the presence of stated structural and functional features, steps, operations, elements, and/or components, but do not preclude the presence or addition of one or more other structural and functional feature, steps, operations, elements, components, and/or groups thereof.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields, electron spins particles, electrospins, or any combination thereof.

The term "topology" as used herein refers to interconnections of circuit components and, unless stated otherwise, indicates nothing of physical layout of the components or their physical locations relative to one another. Figures described or otherwise identified as showing a topology are no more than a graphical representation of the topology and do not necessarily describe anything regarding physical layout or relative locations of components.

Figure 1:
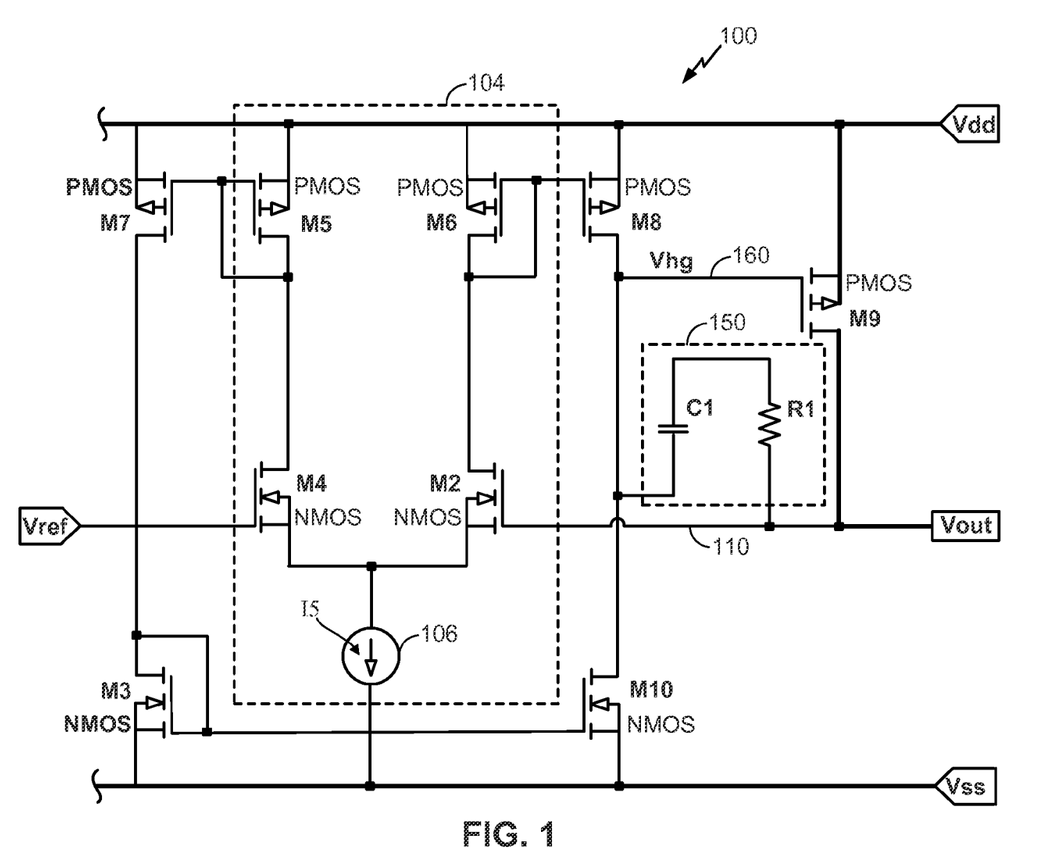
FIG. 1 shows a topology for one example MO regulator unit.

FIG. 1 shows a topology for one example LDO regulator 100, having a differential amplifier 101 and a pass gate M9 that provides a controllable resistance for conductance) coupling between an external power rail Vdd (hereinafter "Vdd rail") and a regulated output voltage Vout terminal. In the FIG. 1 example, the pass gate M9 is a PMOS transistor. The differential amplifier 104 receives as its differential inputs a reference voltage, Vref, and a feedback of Vout (over feedback element or feedback path 110). The differential amplifier 104 generates, based on the difference of Vref and the fed back Vout, a pass gate control signal at Vhg voltage (hereinafter referenced as "pass gate control signal Vhg") that is coupled, by pass gate control line 160, to the control gate (shown but not separately numbered) of the pass gate M9. By operation of the feedback, the generated pass gate control signal Vhg drives the resistance of pass gate M9 to a value at which Vout is, in this example, approximately equal to Vref. It will be understood that Vout being approximately equal to Vref is only for purposes of example. For example, a voltage divider (not shown) may be included to generate Vout higher than Vref.

Referring to FIG. 1, differential amplifier 104 is formed of two parallel branches (shown but not separately numbered) extending from the Vdd rail to a common node (shown but not separately numbered). A tail current source 106 sinks a bias current I5 from the common node to a reference rail Vss. One of the two branches comprises internal load transistor M5 in series with input transistor M4, the other comprises internal load transistor M6 in series with input transistor M2. The current I5 of the tail current source 106 sets the bias of the input transistors M2 and M4. I5 is fixed. The gate (shown but not separately numbered) of input transistor M4 functions as one of the differential amplifier 104 inputs (shown but not separately labeled), and receives Vref. The gate (shown but not separately labeled) of input transistor M2 receives functions as the other of the differential amplifier 104 inputs, by receiving Vout through the feedback path 110. The differential amplifier 104 inputs may be collectively referenced as the "differential inputs" or the "difference inputs."

Referring to FIG. 1, transistors M3, M7, M8 and M10 form an intermediate buffer stage (shown but not separately numbered). The drain of M8 drives the pass gate control line 160 with the pass gate control signal Vhg. M8 may therefore be considered a drive transistor for the pass gate control signal Vhg.

It will be understood by persons of ordinary skill in the art, having view of this disclosure, that the feedback loop comprises the differential amplifier 104, the pass control drive transistor M8, the pass gate M9, the feedback path 110, and the Miller feedback compensation network 150. The Miller feedback compensation network 150 may be formed of resistor element R1 and capacitor element C1. The Miller feedback compensation network 150 produces a dominant pole along with a zero in the feedback response of the feedback loop, which provides stability. The general operation of Miller feedback compensation is known to persons of ordinary skill in the art and, therefore, further detailed description of the operation is omitted except where incidental to other described operation.

A plurality of LDO regulators including, but not limited to the FIG. 1 example LDO regulator 100, may be used in providing regulated supply voltage within integrated circuit (IC) chips (not shown) having a plurality of circuit blocks (not shown), for example multiple processor cores. Such IC chips may include, in various applications, selective power-up features, for example, selective powering up and powering down individual circuit blocks, or subsets of the circuit blocks. In certain applications, if the powering up of individual circuit blocks (e.g., processor cores) includes simply switching on and off an LDO regulator such as the FIG. 1 example LDO regulator 100, a result may be large in-rush currents. The large in-rush currents, if not mitigated, may result in unwanted incidents of high rate current change, i.e., high di/dt, on the power supply lines. Costs may therefore be incurred, for example, added hardware costs due to a larger sized LDO regulator 100 to provide for the large current pulses in such incidents. Another potential effect of high in-rush currents, which in some applications can carry higher costs than high di/dt alone, is ringing on the power supply lines.

One known conventional technique directed to reducing in-rush current, and thus avoiding its above-described effects, is keeping Vref of the LDO regulator 100 at low or zero voltage until the circuit blocks it supplies are powered up, and then ramping up Vref to its operational value.

However, this known conventional technique can introduce unwanted effects and/or may incur additional costs and, therefore, may be less than preferable. For example, one mechanism that may embody or cause certain unwanted effects is that starting with Vref at a very low (or zero) voltage can render the feedback operation, which is crucial to the LDO regulator 100, inoperative.

Figure 2:
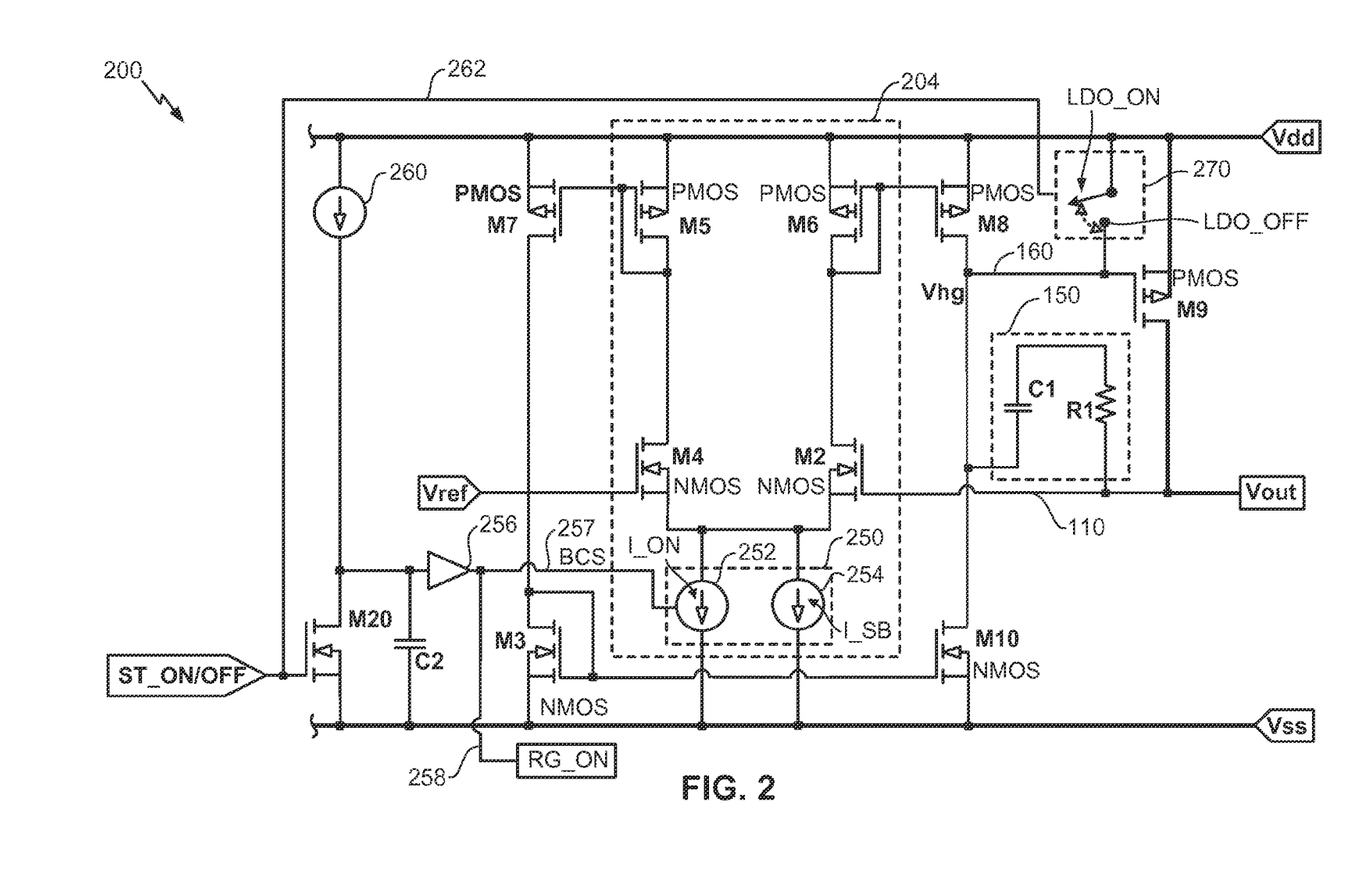
FIG. 2 shows a topology of one example reduced switch-on slew LDO regulator in accordance with one exemplary embodiment.

FIG. 2 shows one topology of one example reduced switch-on slew rate LDO regulator 200 in accordance with one exemplary embodiment that can provide, among other features, limited slew rate switch-on in combination with a stable transition. Among various additional benefits may be a substantial reduction or avoidance of high di/dt, or ringing, or both, on power lines.

For brevity, the term "reduced switch-on slew rate LDO regulator 200" will alternatively be recited as "reduced SSR LDO regulator 200." It will be understood that "SSR" has no inherent meaning, and imports no meaning from outside this disclosure; it is simply an abbreviation for "switch-on slew rate."

The FIG. 2 reduced SSR LDO regulator 200 is shown as an example implementation adapted to, or utilizing portions of the FIG. 1 LDO topology 100. This example implementation is for convenience and focus of description on reduced switch-on slew concepts without introducing, and therefore having to fully describe, all structures of an entire LDO regulator topology. It will be understood that the FIG. 2 example is not intended, though, to limit the scope of any of the exemplary embodiments to structures or practices employing LDO topologies as shown by FIG. 1. For example, it will be readily appreciated by persons of ordinary skill in the art upon reading this disclosure that reduced switch-on slew rate according to one or more exemplary embodiments may be practiced with other differential amplifier topologies, and with various LDO topologies other than the FIG. 1 example 100.

Referring to FIG. 2, the reduced SSR LDO regulator 200 comprises a pass gate M9 having a resistance or conductance controlled by controllable slew differential amplifier 204, to apply a voltage drop between the Vdd rail and Vout that maintains Vout, in this example, at Vref. It will be understood that embodiments are not limited to maintaining Vout at Vref. For example, Vout may be made proportional to Vref, by modification readily implemented by persons skilled in the art having view of this disclosure.

The controllable slew differential amplifier 204 controls the pass gate M9 based on the given reference voltage Vref and a feedback of Vout received, for example, over the previously described feedback path 110. The controllable slew differential amplifier 204 feeds, in the FIG. 2 example, a second stage, or intermediate stage buffer (shown but not separately numbered) formed, for example, of the previously described M3, M7, M8 and M10. In the FIG. 2 example implementation, M8 outputs the pass gate control signal Vhg to a pass gate control line 160 that couples to the control gate (input shown, but not separately numbered) of the pass gate M9.

In accordance with one exemplary embodiment, the controllable slew differential amplifier 204 includes a switchable mode tail current source 250. In an aspect, the switchable mode tail current source 250 is configured to be switchable in response to (or in response to a trigger signal that is associated with) a given system on/off or power-up/power-down signal, labeled "ST_ON/OFF." In an aspect, the switchable mode tail current source 250 may be configured to switch, in response to transitions in ST_ON/OFF, between a full-slew, or normal operating mode in which it sources a normal operating bias current, and a reduced-slew mode in which it sources a much smaller, slew-limiting bias current.

Referring to FIG. 2, in an aspect the switchable mode tail current source 250 may include an ON-OFF switchable current source such as switchable full-slew bias current source 252 in parallel with a smaller slew-limiting bias current source 254, which can be always in an ON state. Further to this aspect, the switchable full-slew bias current source 252 may source, in its ON state, a full-slew current, arbitrarily labeled I_ON and, in its OFF state, a zero or approximately zero current. The slew-limiting bias current source 254 may be configured to source a much smaller bias current than arbitrarily labeled I_SB. The magnitude of I_SB, in an aspect, may be sufficient to allow the controllable slew differential amplifier 204 to slew over a given interval, but at a much slower rate than would occur if the switchable full-slew bias current source 752 were ON.

As to the actual magnitude of I_ON and I_SB, it will be appreciated by persons of ordinary skill in the art, from viewing this disclosure, that these magnitudes may be application-specific. Determining I_ON and I_SB for a given application, though, can be readily performed by persons of ordinary skill in the art, for example, by applying conventional bias current selection techniques to the present disclosure. Further detailed description of the actual magnitude of I_ON and I_SB is therefore omitted.

With respect to topologies and technologies for implementing the switchable hill-slew bias current source 252, and the slew-limiting bias current source 254, in an aspect these may be according to general known conventional techniques for current sources and switchable current sources. Further detailed description is therefore omitted.

In an aspect, the reduced SSR LDO regulator 200 may include a slew control feature, described in greater detail at later sections, that provides a timing delay, arbitrarily named in this disclosure as "DLY, before the switchable mode tail current source 250 switches to an ON biasing state after an OFF-to-ON transition of ST_OFF/ON. This delayed switching of the switchable mode tail current source 250 can be provided, for example, by generating, in response to an OFF-to-ON transition of ST_OFF/ON, a ramp-up or equivalent time-increasing voltage at the input of a buffer 256. The buffer 256 may have its output coupled, for example by a current source control line 257, to a control input (shown but not separately labeled) of the switchable full-slew bias current source 252. In a related aspect, a signal output of the buffer 256 can be termed a biasing current source control signal (BCS). In a further aspect, when the input voltage of the buffer 256 reaches what may be termed an OFF-to-ON logical switching threshold, the buffer 256 switches to generate BCS at an ON level, where "ON" means it switches the switchable full-slew bias current source 252 to an ON state.

In one aspect, the timing delay DLY may be provided by configuring a circuitry that charges the input to the buffer 256 to ramp-up the voltage to reach the buffer 356 switching threshold at DIN after the OFF-to-ON transition of ST_OFF/ON. For example, in the FIG. 2 reduced SSR LDO regulator 200, DLY is implemented by charging current source 260 that, under control of charging switch transistor M20, charges a delay capacitor C2 that is coupled to the input of the buffer 256. The DLY value is the charging time duration, starting at an OFF-to-ON transition of ST_OFF/ON and ending when the charge on the delay capacitor C2 reaches an OFF-ON threshold voltage of the buffer 256. That OFF-ON threshold voltage of the buffer 256 may be termed "the tail current source mode switch threshold." In an aspect, the DLY value, i.e., the charging duration of C2, may be established by the capacitance of C2, together with the drive capacity of the charging current source 260, and the OFF-ON threshold of the buffer 256. In an aspect, selecting DLY can be based, at least in part, on the RC time constant of a discharge path formed by the previously described compensation capacitor C1 and compensation resistor R1 of the Miller feedback compensation network 150, as described in greater detail at later sections.

Referring to FIG. 2, in an aspect, the reduced SSR LDO regulator 200 may include a pass gate disabling feature that provides a switching of the pass gate M9 to an OFF state in response to ST_OFF/ON switching to an OFF state. The FIG. 2 example reduced SSR LDO regulator 200 includes one example implementation of this feature, utilizing a pass gate disabling switch 270 coupled to the ST_OFF/ON signal by, for example, a pass gate disabling signal line 262, in combination with the compensation capacitor C1. Aspects of the pass gate disabling feature will be further understood from detailed description below of example operations.

Example operations demonstrating, on the FIG. 2 reduced SSR LDO regulator 200, concepts according to various embodiments will now be described. As a preliminary matter, it will be understood that in describing transitions of ST_OFF/ON, the phrases "ON-to-OFF transition (or transitioning)" are used, for brevity, in place of "transition (or transitioning) from an ON state to an OFF state," Likewise, the phrases "OFF-to-ON transition (or transitioning)" are used in place of "transition (or transitioning) from an OFF state to an ON state."

Referring still to FIG. 2, one example operation may begin with an arbitrarily selected event of an ON-to-OFF transition of ST_OFF/ON, which is to a "high" level in this example. The ST_OFF/ON transition causes the pass gate disabling switch 270 to move to the operational, i.e., closed, or "LDO_OFF" position. The LDO_OFF position functions to short the control gate of the pass gate M9 to the Vdd rail, i.e., shorts the pass gate control line 160 to the Vdd rail. In an aspect, the ON-to-OFF transition of ST_OFF/ON over-rides the pass gate control signal Vhg with the Vdd rail voltage. Vdd, in turn, holds the pass gate M9 in an OFF state. Referring to FIG. 2, it is seen that one terminal of C1, which can be appreciated as being a capacitor of the Miller feedback compensation network 150, is also connected to the Vdd rail through the pass gate disabling switch 270. The other terminal of C1, through resistor R1, is pulled down by the load (not shown) coupled to the Vout port or line. Since the pass gate M9 is OFF, the Vout voltage is approximately 0 volts. Input transistor M2 of the controllable slew differential amplifier 204 receives the approximately 0 volts through the feedback path 110 and is therefore OFF. At the same time, or at substantially the same time, the voltage on delay capacitor C2 is discharged through M20 to the given rail Vss, which for this example may be assumed as 0 volts. The voltage on delay capacitor C2, being 0 volts, causes the switchable full-slew bias current source 252 to switch to its OFF state.

As previously described, the FIG. 2 example reduced SSR LDO regulator 200 has a switchable mode tail current source 250 that includes a switchable full-slew bias current source 252 and a slew-limiting bias current source 254. Therefore, while the switchable full-slew bias current source 252 is in its OFF state, the slew-limiting bias current source 254 provides continued flow of a very small bias current I_SB. As also previously described, in an aspect, I_SB is sufficient to allow the controllable slew differential amplifier 204 to slew at a slew-limited or reduced slew rate. When an OFF-to-ON transition of ST_ON/OFF occurs, (i.e., when ST_ON/OFF transitions from high to low, using the example polarities), there are two resulting actions. One is the pass gate disabling switch 270 moves to the LDO_ON position, i.e., the pass gate disabling switch 270 opens. The other is the ST_ON/OFF trigger switch M20 switches OFF, in turn allowing the current source 260 to charge the delay capacitor C2. When the delay capacitor C2 reaches the OFF-ON threshold voltage of the buffer 256, the buffer 256 outputs the biasing current source control signal BCS at the ON level. The switchable full-slew bias current source 252 switches ON.

In an aspect, prior to the delay capacitor C2 reaching the OFF-ON threshold of the buffer 256, the reduced SSR LDO regulator 200 slews to Vref at a reduced or slew-limited rate. The reduced slew rate is established, at least in part, by the I_SB current, and by the resistance of R1 and the capacitance of C2. In an aspect, the reduced slew rate is set such that the voltage on C2 switches the ON-OFF full-slew bias current source ON just after, or substantially concurrent with, Vout reaching Vref.

It will be understood that the above-described low-rate stewing of the reduced SSR regulator 200 is enabled, and begins, upon the ST_ON/OFF signal opening the pass gate disabling switch 270. The opening allows the C1 capacitor to discharge the Vdd volts previously on the pass gate control line 160, through the resistor R1. The discharging of the Wig line, in turn, allows the controllable slew differential amplifier 204 and the pass gate driver M8 to start stewing the voltage on the pass gate control line 160. The slew, however, is limited by the small I_SB current sourced by the slew-limiting bias current source 254, in combination with the compensation cap C1.

As the voltage on the Vhg is slewing, at a reduced rate limited by I_SB of the slew—limiting bias current source 254, as well as the capacitance of C1 and the resistance of R1, the voltage on the delay capacitor C2 is also increasing, as described above. In an aspect, the capacitance of C2, the capacitance of C1 and resistance of R1 can be configured with the following timing objective: preferably concurrent with or shortly after Vout reaches Vref, the voltage on the delay capacitor C2 reaches the value (e.g., the ON voltage of the buffer 256) that causes a switching ON of the switchable full-slew bias current source 252. Persons of ordinary skill in the art, having view of the present disclosure, can readily configure the resistance of R1, and the respective capacitances of C1 and C2 such that the FIG. 2 reduced SSR LDO regulator 200 or its equivalent implementations, meet this timing objective, without undue experimentation. For example, without limitation, such persons can implement capacitors C1 and C2 using the same process type, or derive current sources 252 and 254 from the same bias generator.

Referring to FIG. 2, in an aspect, the biasing current source control signal BCS that is output of the buffer 256 may also be communicated as a regulator state signal "RG_ON, for example, on the regulator state indicator line 258, to a high-level system controller (not shown).

It will be understood that the above-described operations provide a method for reduced switch-on slew LDO regulating that includes biasing the controllable slew differential amplifier 204, during a normal powered-up operation, with the full-slew bias current I_ON. It will also be understood that above-described operations provide a method for reduced switch-on slew LDO regulating that includes, in response to an ON-to-OFF transition of a system on/off signal ST_ON/OFF, moving the pass gate disabling switch 270 to the disable position. The resulting pulling of the pass gate control line 160 to Vdd over-rides the pass gate control signal Vhg and switches OFF, i.e., disables, the pass gate M9. The disabling of the pass gate M9 effectively disables a feedback of the controllable slew differential amplifier 204. The ON-to-OFF transition of ST_ON/OFF, switches also switches ON the charging switch transistor M20, which pulls the input of the buffer 256 to a level causing it to generate the biasing current source control signal. BCS at an OFF level, at which the switchable mode tail current source 250 sources only the slew-limiting bias current I_SB. Then, in response to an OFF-to-ON transition of ST_ON/OFF, the pass gate disabling switch 270 moves to an operational position, enabling the pass gate M9, allowing C1 to discharge, and enabling the feedback of the controllable slew differential amplifier 204. These operations, in turn, allow the controllable slew differential amplifier 204 to slew toward Vref. But the delay capacitor C2 causes a delay, DLY, in the switchable mode tail current source 250 switching to the full-slew bias current I_ON. Until expiration of the delay DLY after the OFF-to-ON transition of ST_ON/OFF, the controllable slew differential amplifier 204 stews at a reduced slew rate imposed by the slew-limiting bias current I_SB. Upon expiration of the delay DLY, the delay capacitor C2 reaches the switching threshold of the buffer 256, causing it to output the biasing current control signal BCS to the switchable mode tail current source 250 at the ON level. The resulting I_ON biases the controllable slew differential amplifier 204 to a full-slew operation.

As readily appreciated by persons of skill from the present disclosure, features of a reduced switch-on slew rate LDO regulator according to the exemplary embodiments include, but are not limited to a reduced rate, or "slow," turn-on of LDO output from power collapse to Vref, while substantially reducing issues pertaining to in-rush current. Another of the various features of reduced switch-on slew rate LDO regulators according to the exemplary embodiments is minimal, if any, added cost relative to a comparable capacity conventional (e.g. FIG. 1) LDO regulator known conventional hardware and design overhead. For example, the FIG. 2 reduced SSR LDO regulator 200 provides re-use of an existing compensation capacitor, as shown by its re-use of C1 of the Miller feedback compensation network 150, to assist in the reduced slew rate turn-on. As another example, the FIG. 2 reduced SSR LDO regulator 200 requires only one additional capacitor, the delay capacitor C2. As still another example, the FIG. 2 reduced SSR LDO regulator 200 requires no extra control circuitry to enable or provide the smooth ramp-up. Instead, all "control" can be provided by simply selecting appropriate relative component values, for example capacitances C1, C2, or resistance R1, or both.

It will be understood that the above-described FIG. 2 example topology of the switchable mode tail current source 250 is not intended to limit the scope of the embodiments. For example, in one alternative aspect the slew-limiting bias current source 254 may be configured such that, after switching ON in response to an OFF-ON switching of ST_OFF, it stays ON until the reduced SSR LDO regulator 200 stews to an operational state, and then switches OFF.

Figure 3:
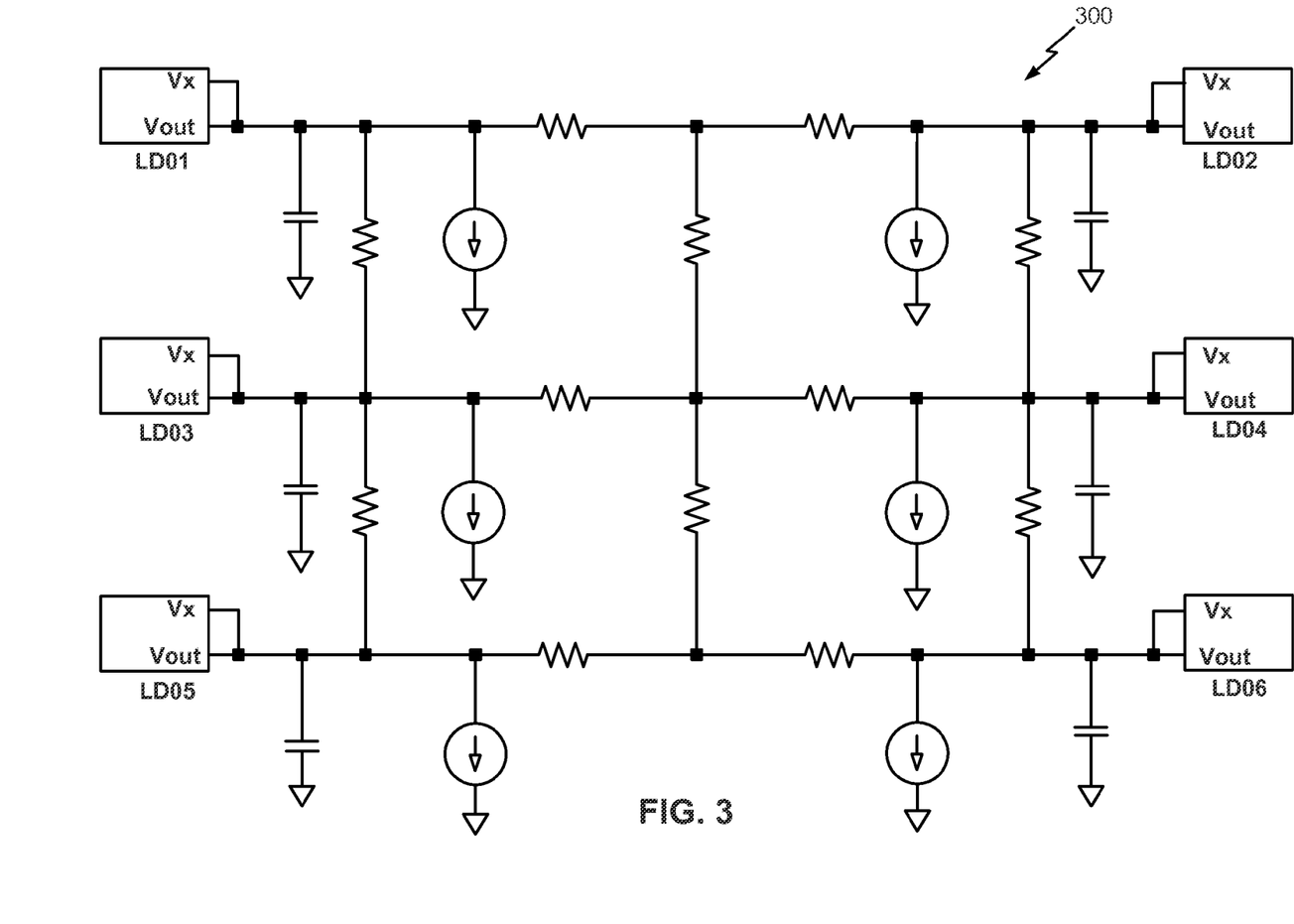
FIG. 3 shows one topology of a power distribution network having a plurality of FIG. 2 reduced switch-on slew LDO regulator units connected in parallel, exemplary parasitic elements of the interconnecting power distribution network.

FIG. 3 shows a topology 300 with an example of six adaptive bias and compensation LDO regulators, illustrated with abbreviated labels LDO1, LDO2 . . . LDO6, connected in parallel and showing parasitic elements (shown but not separately labeled) of the power distribution network that interconnects them. It may be assumed that each of adaptive bias and compensation LDO regulators LDO1, LDO2 . . . LDO6 is according to the FIG. 2 example reduced SSR LDO regulator 200. It may be assumed that each of the LDO regulators LDO1, LDO2 . . . LDO6 has a Vref input (not shown) and that each Vref input is connected to Vref source (not shown). In an aspect, at least one Vref source (not shown) may be shared by two or more of the adaptive bias and compensation LDO regulators LDO1, LDO2 . . . LDO6. It will be understood that the FIG. 3 capacitors (shown but not separately labeled) may represent explicitly placed load capacitances as well as parasitic capacitances.

Figure 4:
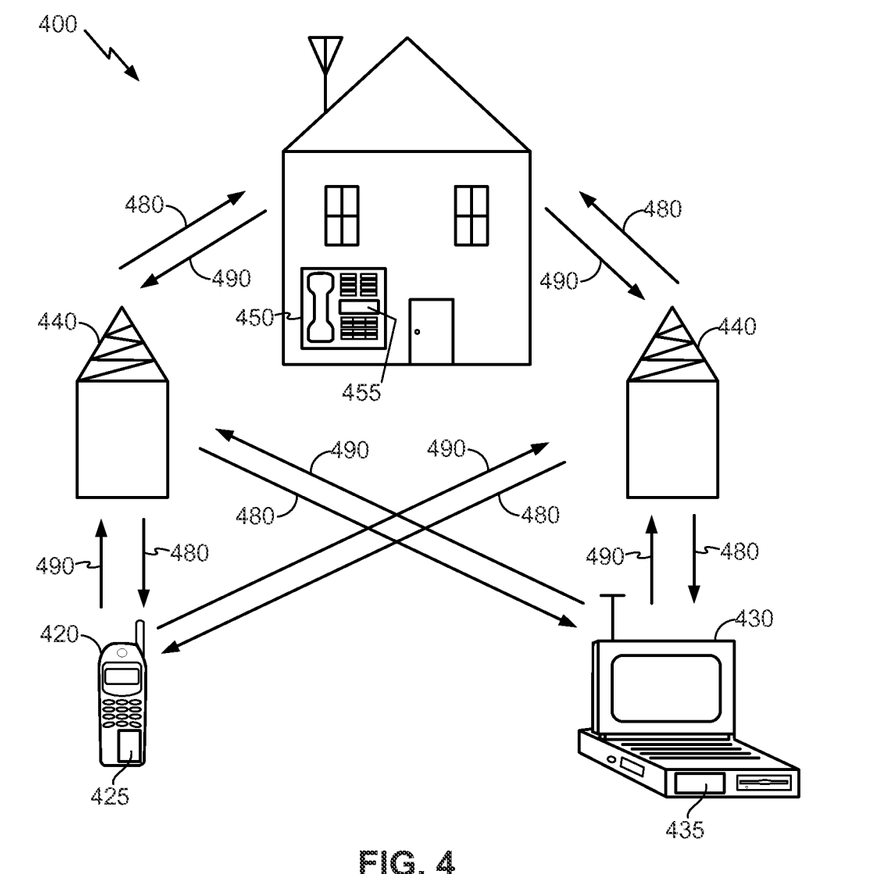
FIG. 4 shows a system diagram of one wireless communication system having, supporting, integrating and/or employing reduced switch-on slew LDO units in accordance with one or more exemplary embodiments.

FIG. 4 illustrates an exemplary wireless communication system 400 in which one or more embodiments of the disclosure may be advantageously employed. For purposes of illustration, FIG. 4 shows three remote units 420, 430, and 450 and two base stations 440. It will be recognized that conventional wireless communication systems may have many more remote units and base stations. The remote units 420, 430, and 450 include integrated circuit or other semiconductor devices 425, 435 and 455 (including on-chip voltage regulators, as disclosed herein), which are among embodiments of the disclosure as discussed further below. FIG. 4 shows forward link signals 480 from the base stations 440 and the remote units 420, 430, and 450 and reverse link signals 490 from the remote units 420, 430, and 450 to the base stations 440.

In FIG. 4, the remote unit 420 is shown as a mobile telephone, the remote unit 430 is shown as a portable computer, and the remote unit 450 is shown as a fixed location remote unit in a wireless local loop system. For example, the remote units may be any one or combination of a mobile phone, hand-held personal communication system (PCS) unit, portable data unit such as a personal data assistant (PDA), navigation device (such as GPS enabled devices), set top box, music player, video player, entertainment unit, fixed location data unit such as meter reading equipment, or any other device that stores or retrieves data or computer instructions, or any combination thereof. Although FIG. 4 illustrates remote units according to the teachings of the disclosure, the disclosure is not limited to these exemplary illustrated units. Embodiments of the disclosure may be suitably employed in any device having active integrated circuitry including memory and on-chip circuitry for test and characterization.

The foregoing disclosed devices and functionalities (such as the devices of FIG. 2, 3 or 4 or any combination thereof) may be designed and configured into computer files (e.g., RTL, GDSII, GERBER etc.) stored on computer readable media. Some or all such files may be provided to fabrication handlers who fabricate devices based on such files. Resulting products include semiconductor wafers that are then cut into semiconductor die and packaged into a semiconductor chip. The semiconductor chips can be employed in electronic devices, such as described hereinabove.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for implementation. Accordingly, the invention is not limited to illustrated examples and any means for performing the functionality described herein are included in embodiments of the invention.

The foregoing disclosed devices and functionalities may be designed and configured into computer files (e.g. RTL, GDSII, GERBER, etc.) stored on computer readable media. Some or all such files may be provided to fabrication handlers who fabricate devices based on such files. Resulting products include semiconductor wafers that are then cut into semiconductor die and packaged into a semiconductor chip. The chips are then employed in devices described above.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A reduced switch-on slew low dropout (LDO) regulator, further comprising:
    a pass gate, configured to controllably couple a voltage rail to a regulator output, the control being based in part on a pass gate control signal;
    a controllable slew differential amplifier, switchable between a slew-limiting state and a full-slew state, the controllable slew differential amplifier being configured to receive a feedback from the regulator output, and to generate the pass gate control signal, based on a reference voltage and the feedback, at a full-slew rate in the full-slew state, and at a reduced slew rate in the slew-limiting state;
    a pass gate disabling circuit, configured to selectively override the pass gate control signal and switch the pass gate OFF;
    a switchable tail current source, coupled to the controllable slew differential amplifier, configured as switchable between sourcing a slew-limiting bias current and sourcing a full-slew bias current, and comprising a switchable full-slew bias current source and a slew-limiting bias current source, the switchable full-slew bias current source being configured to source the full-slew bias current when ON, the slew-limiting bias current source being in parallel with the switchable full-slew bias current source and configured to source the slew-limiting bias current; and
    a tail current control circuit, configured to switch OFF the switchable full-slew bias current source in response to an ON-to-OFF transition of a system ON-OFF signal (ST_ON/OFF) and, at a delay DLY after an OFF-to-ON transition of ST_ON/OFF, to switch ON the switchable full-slew bias current source.

2. The reduced switch-on slew LDO regulator of claim 1, wherein the LDO regulator is configured to generate the pass gate control signal at the full-slew rate when biasing a transistor with the full-slew bias current, and at the reduced slew rate when biasing the transistor with the slew-limiting bias current.

3. A The reduced switch-on slew low-dropout (LDO) regulator, further comprising
    a pass gate, configured to controllably couple a voltage rail to a regulator output, the control being based in part on a pass gate control signal;
    a controllable slew differential amplifier, switchable between a slew-limiting state and a full-slew state, the controllable slew differential amplifier being configured to receive a feedback from the regulator output, and to generate the pass gate control signal, based on a reference voltage and the feedback, at a full-slew rate in the full-slew state, and at a reduced slew rate in the slew-limiting state;
    a pass gate disabling circuit, configured to selectively override the pass gate control signal and switch the pass gate OFF;
    a switchable tail current source, coupled to the controllable slew differential amplifier, and configured as switchable between sourcing a slew-limiting bias current and sourcing a full-slew bias current; and
    a tail current control circuit, configured to switch the switchable tail current source to the slew-limiting bias current in response to an ON-to-OFF transition of a system ON-OFF signal (ST_ON/OFF) and, at a delay (DLY) after an OFF-to-ON transition of ST_ON/OFF, to switch the switchable tail current source from the slew-limiting bias current to the full-slew bias current.

4. The reduced switch-on slew LDO regulator of claim 3, wherein the controllable slew differential amplifier is further configured to slew, in response to the OFF-to-ON transition of ST_ON/OFF, from an initial zero voltage to approximately Vref, at a slew rate slewing from the initial zero voltage to approximately Vref in a time duration approximately equal to DLY.

5. The reduced switch-on slew LDO regulator of claim 4, wherein the tail current control circuit includes a delay capacitor, and a charging circuit, the charging circuit being configured to charge the delay capacitor in response to the OFF-to-ON transition of ST_ON/OFF, from a zero voltage to a tail current source mode switch threshold, in a charging time having a duration approximately equal to DLY.

6. The reduced switch-on slew LDO regulator of claim 5, wherein the charging circuit includes a trigger switch, the trigger switch being coupled to a charging current source.

7. A reduced switch-on slew low-dropout (LDO) regulator, further comprising:
 a pass gate, configured to controllably couple a voltage rail to a regulator output, the control being based in part on a pass gate control signal;
 a controllable slew differential amplifier, switchable between a slew-limiting state and a full-slew state, the controllable slew differential amplifier being configured to receive a feedback from the regulator output, and to generate the pass gate control signal, based on a reference voltage and the feedback, at a full-slew rate in the full-slew state, and at a reduced slew rate in the slew-limiting state;
 a pass gate disabling circuit, configured to selectively override the pass gate control signal and switch the pass gate OFF;
 a pass gate control line, the pass gate control line being configured to carry the pass gate control signal to a control gate of the pass gate, the pass gate disabling circuit comprising a two-position switch, the two-position switch having a disabling position and an operational position;
 a feedback element, coupled to the regulator output and to an input of the controllable slew differential amplifier, in a configuration to provide said feedback; and
 a compensation network, configured to couple the pass gate control line to the feedback element, the compensation network having a compensation capacitor and a compensation resistor,
 the pass gate disabling circuit being further configured to charge the compensation capacitor when the two-position switch is in the disabling position, and to allow the compensation capacitor to discharge the pass gate control line, to a voltage at which the pass gate is operational, in response to switching the two-position switch from the disabling position to the operational position, and
 the disabling position providing a short of the control gate to a voltage disabling the pass gate, and the operational position not providing the short of the control gate, the two-position switch being configured to switch between the disabling position and the operational position based on an ON-OFF state of ST_OFF/ON.

8. The reduced switch-on slew LDO regulator of claim 7, wherein a rate of the reduced slew rate is based, at least in part, on at least one of a capacitance of the compensation capacitor or a resistance of the compensation resistor, or both.

9. The reduced switch-on slew LDO regulator of claim 8, wherein the controllable slew differential amplifier includes a switchable tail current source, the switchable tail current source being configured as switchable between sourcing a slew-limiting bias current and a full-slew bias current,
 the controllable slew differential amplifier being configured to generate the pass gate control signal at the full-slew rate with the full-slew bias current, and at the reduced slew rate with the slew-limiting bias current, and
 the rate of the reduced slew rate being further based, at least in part, on the slew-limiting bias current and at least one of the capacitance of the compensation capacitor or the resistance of the compensation resistor, or both.

10. The reduced switch-on slew LDO regulator of claim 9, further comprising a tail current control circuit, the tail current control circuit being configured to switch the switchable tail current source to the slew-limiting bias current in response to an ON-to-OFF transition of a system ON-OFF signal (ST_ON/OFF) and, at a delay DLY after an OFF-to-ON transition of ST_ON/OFF, to switch the switchable tail current source from the slew-limiting bias current to the full-slew bias current.

11. The reduced switch-on slew LDO regulator of claim 10, the controllable slew differential amplifier being configured to slew, in response to the OFF-to-ON transition of ST_ON/OFF, from an initial zero voltage to approximately Vref, at a slew rate slewing from the initial zero voltage to approximately Vref in a time duration approximately equal to DLY.

12. The reduced switch-on slew LDO regulator of claim 11, wherein the tail current control circuit includes a capacitor and a charging current source, the charging current source being configured to charge the capacitor from a zero voltage to a tail current source mode switch threshold in a charging time duration approximately equal to DLY.

13. A method for reduced switch-on slew low dropout (LDO) regulating with a pass gate controlled by a differential amplifier having differential inputs, and a transistor controlled by one of the differential inputs, comprising:
 biasing the transistor with a full-slew bias current;
 providing to the differential inputs a reference voltage and a feedback, the feedback being of an output of the pass gate;
 in response to an ON-to-OFF transition of a system on/off signal (ST_ON/OFF), disabling the feedback and switching to biasing the transistor with a slew-limiting bias current, the slew-limiting bias current being lower than the full-slew bias current;
 in response to an OFF-to-ON transition of ST_ON/OFF, enabling the feedback; and
 at a time delayed from the OFF-to-ON transition of ST_ON/OFF by a reduced slew duration, switching to biasing the transistor with the full-slew bias current.

14. The method of claim 13, wherein the switching to biasing the transistor with the full-slew bias current includes commencing, in response to the OFF-to-ON transition of ST_ON/OFF, a charging of a delay capacitor and, in response to a voltage of the delay capacitor reaching a given threshold voltage level, performing the switching to biasing the transistor with the full-slew bias current.

15. The method of claim 13, wherein biasing the transistor with the full-slew bias current comprises:
 generating, in response to the ON state of ST_ON/OFF, a biasing current source control signal at an ON level, and
 controlling a current source coupled to the transistor based on the biasing current source control signal at the ON level.

16. The method of claim 15, wherein switching to biasing the transistor with the slew-limiting bias current comprises:
generating, in response to the ON-to-OFF transition of ST_ON/OFF, the biasing current source control signal at an OFF level; and
controlling the current source coupled to the transistor based on the biasing current source control signal at the ON level.

17. The method of claim 16, wherein the switching to biasing the transistor with the full-slew bias current includes commencing, in response to the OFF-to-ON transition of ST_ON/OFF, a charging of a delay capacitor and, in response to a voltage of the delay capacitor reaching a given voltage level, performing the switching to biasing the transistor with the full-slew bias current.

18. A reduced switch-on slew low dropout (LDO) regulator comprising:
a differential amplifier, the differential amplifier having difference inputs, an output, and a transistor, the transistor having a gate coupled to one of the difference inputs;
a pass gate, configured as being controlled by the output of the differential amplifier, the pass gate having a pass gate input and a pass gate output, the pass gate input being configured to couple to a power rail, and;
means for receiving a system ON/OFF signal (ST_ON/OFF) and,
in response to an OFF-to-ON transition of ST_ON/OFF, establishing a feedback, the feedback being from the pass gate output to one of the difference inputs, and biasing the transistor with a full-slew bias current, and
in response to an ON-to-OFF transition of ST_ON/OFF, disabling the feedback and switching to biasing of the transistor with a slew-limiting bias current.

* * * * *